(12) United States Patent
Kobayashi et al.

(10) Patent No.: US 7,662,421 B2
(45) Date of Patent: Feb. 16, 2010

(54) CONTAINER-PACKED, OIL-IN-WATER TYPE EMULSIFIED FOOD PRODUCT AND METHOD FOR MANUFACTURE THEREOF

(75) Inventors: Hideaki Kobayashi, Tokyo (JP); Masahiro Ariizumi, Tokyo (JP); Yasuhiko Shigematsu, Tokyo (JP); Mitsuru Takamiya, Tokyo (JP); Hajime Matsuda, Tokyo (JP); Nobuhisa Sakabe, Tokyo (JP)

(73) Assignee: Q.P. Corporation, Tokyo (JP)

( * ) Notice: Subject to any disclaimer, the term of this patent is extended or adjusted under 35 U.S.C. 154(b) by 823 days.

(21) Appl. No.: 10/505,147

(22) PCT Filed: Mar. 18, 2003

(86) PCT No.: PCT/JP03/03213

§ 371 (c)(1),
(2), (4) Date: Aug. 20, 2004

(87) PCT Pub. No.: WO03/077677

PCT Pub. Date: Sep. 25, 2003

(65) Prior Publication Data

US 2005/0123655 A1    Jun. 9, 2005

(30) Foreign Application Priority Data

Mar. 18, 2002    (JP) .............................. 2002-073434

(51) Int. Cl.
*A23L 1/24* (2006.01)
(52) U.S. Cl. ...................................... 426/605; 426/601
(58) Field of Classification Search .................. 426/605
See application file for complete search history.

(56) References Cited

U.S. PATENT DOCUMENTS 2,940,860 A * 6/1960 Sarett ........................... 426/10
5,976,587 A * 11/1999 Yamauchi et al. ............ 426/112

FOREIGN PATENT DOCUMENTS

| JP | A 6-141776 | 5/1994 |
| JP | A 10-295341 | 11/1998 |
| JP | A-10-295341 | 11/1998 |
| JP | A 11-504963 | 5/1999 |
| JP | A 11-196816 | 7/1999 |
| JP | 2000-210048 | * 8/2000 |
| JP | A 2000-210048 | 8/2000 |
| JP | 2000-308469 | * 11/2000 |
| JP | A 2000-308469 | 11/2000 |
| WO | WO-A-91/10367 | 7/1991 |

OTHER PUBLICATIONS

Rooney, M. L. 1995. Active Food Packaging. Blackie Academic & Professional. New York. p. 1-9, 143-173.*
Food Education Mini-Book Series "Introduction to Mayonnaise and Dressing," Japan Food Journal Co., Ltd., enlarged and revised version issued on Aug. 8, 1990, pp. 135-146.

* cited by examiner

*Primary Examiner*—Carolyn A Paden
(74) *Attorney, Agent, or Firm*—Oliff & Berridge, PLC

(57) ABSTRACT

In the container-packed, oil-in-water type emulsified food product in accordance with the present invention, an oil-in-water type emulsified food comprises edible oils and fats, vinegar and egg yolk, and is packed and sealed in a container with an oxygen barrier property and has a dissolved oxygen concentration immediately after manufacturing is 0.8 to 8.1% $O_2$. This container-packed, oil-in-water type emulsified food product demonstrates excellent flavor balance and small degradation of quality caused by oxidation during storage.

6 Claims, No Drawings

CONTAINER-PACKED, OIL-IN-WATER TYPE EMULSIFIED FOOD PRODUCT AND METHOD FOR MANUFACTURE THEREOF

TECHNICAL FIELD

The present invention relates to an oil-in-water emulsified food such as mayonnaise, tartar sauce, and salad dressing, which contains edible oils and fats, vinegar, and egg yolk, and more particularly to an container-packed, oil-in-water type emulsified food product comprising the oil-in-water emulsified food which has a taste improved by adjusting the dissolved oxygen concentration.

BACKGROUND ART

It is well known that the taste of a variety of foods is degraded under the effect of oxidation by oxygen present in the air. For this reason, when various foods are distributed or stored, they are typically sealed in metal cans or glass bottles which are impermeable to oxygen or in resin containers which have low oxygen permeability. Furthermore, an antioxidant such as ethylenediamine tetraacetic acid (EDTA) or vitamin E is often introduced into the foods. However, this is not desirable, since consumers tend to avoid using the antioxidant. A technique was developed for reducing the amount of dissolved oxygen in starting materials or preventing the penetration of oxygen during manufacture of various foods. For example, Japanese Patent Application Laid-open No. H6-141776 disclosed a technique for obtaining high-quality coffee beverages by extracting coffee substantially without oxygen. Furthermore, Japanese Patent Application Laid-open No. H10-295341 disclosed a technique for obtaining products with good taste by conducting heat treatment of milk beverages or juices under conditions such that the dissolved oxygen concentration is reduced to 5 ppm or less.

Furthermore, Kohyo (Japanese translation of a PCT application) Publication No. H11-504963 described a technique for removing oxygen dissolved in a salad dressing by using a special enzyme as a technique for removing dissolved oxygen present in oil-in-water type emulsified foods such as salad dressings.

However, many of oil-in-water type emulsified foods, for example mayonnaise, have a high viscosity or contain a large amount of solid ingredients, like tartar sauce. For this reason, the active removal of the dissolved oxygen present in the product during manufacture thereof is generally not conducted because such a procedure greatly increases the production cost, for example, because of complex equipment involved. Therefore, with typical commercial oil-in-water type emulsified foods, only measures aimed at preventing the penetration of oxygen into the finished foods were implemented, those measures including preparing and transporting the starting materials in a sealed production line so as to minimize the penetration of oxygen present in the air into the foods, replacing the head space in containers with nitrogen when the containers are filled with the food, and employing glass bottles and jars which are absolutely impermeable to oxygen or resin multilayer bottle containers with reduced oxygen permeability as containers which are to be filled with the products and sealed.

For this reason, the dissolved oxygen concentration immediately after the production of the commonly, commercially available oil-in-water type emulsified foods is at a comparatively high level of 10 to 15% $O_2$.

With the foregoing in view, the inventors have conducted a study aimed at the development of oil-in-water type emulsified foods of higher quality, this study being focused on active removal of dissolved oxygen present in the starting materials and the food in the process for the manufacture of container-packed, oil-in-water type emulsified food products. Initially, the inventors assumed that if the dissolved oxygen present in oil-in-water emulsified foods is completely removed, then the oxidation of edible oils and fats and various spices and seasoning components can be prevented and container-packed, oil-in-water type emulsified food products that have excellent taste can be produced. However, the results of the study demonstrated that excessively removing the dissolved oxygen present in the oil-in-water type emulsified foods surprisingly adversely affects the taste of the oil-in-water type emulsified foods. Thus, if the dissolved oxygen present in the oil-in-water type emulsified foods is removed in excess, a strong pungent irritating odor of vinegar can be noted, matching of flavors of the edible oils and fats, vinegar, and egg yolk is degraded, and flavor balance is lost.

Thus, it is an object of the present invention to provide an container-packed, oil-in-water type emulsified food product, in which excess oxidation of the oil-in-water type emulsified food in storage is prevented, quality degradation is avoided, and excellent flavor balance is obtained by reducing the amount of dissolved oxygen present in the container-packed, oil-in-water type emulsified food and adjusting it to optimum concentration.

DISCLOSURE OF THE INVENTION

Based on the results of the comprehensive study, the inventors have found that an oil-in-water type emulsified with small quality degradation caused by oxidation during storage and excellent flavor balance can be obtained by decreasing the amount of dissolved oxygen present in the oil-in-water type emulsified food to a predetermined concentration range when the oil-in-water type emulsified food ontaining edible oils and fats, vinegar, and egg yolk is sealed in a container.

Thus, the present invention provides (1) a container-packed, oil-in-water type emulsified food product, comprising an oil-in-water type emulsified food comprising edible oil and fat, vinegar, and egg yolk, wherein said food is packed and sealed in a container with an oxygen barrier property and has a dissolved oxygen concentration of 0.8 to 8.1% $O_2$ immediately after manufacturing, more particularly the food product in which the dissolved oxygen concentration after storing in a dark place at a temperature of 20° C. for 10 days after manufacturing is 0.5 to 6.2% $O_2$.

The present invention also provides:

(2) a method for manufacturing a container-packed, oil-in-water type emulsified food product comprising an oil-in-water type emulsified food comprising edible oil and fat, vinegar and egg yolk, comprising the steps of:

adjusting a dissolved oxygen concentration in the oil-in-water type emulsified food to 0.8 to 8.1% $O_2$ by deoxygenation treatment of the oil-in-water type emulsified food or starting materials therefor; and packing and sealing the food in a container with an oxygen barrier property.

In the description of the invention (1), the expression "immediately after manufacturing" means the manufacturing day or the next day. The dissolved oxygen concentration of the container-packed, oil-in-water type emulsified food product (1) after manufacturing differs depending on storage temperature, level of oxygen barrier property of the container, the number of storage days and the like. The dissolved oxygen concentration generally decreases to 0.5 to 6.2% $O_2$ if the product is stored for 10 days at a temperature of 20° C. after manufacturing.

The dissolved oxygen concentration in the oil-in-water type emulsified food, which is observed 10 days after manufacturing, is lower than that immediately after manufacturing because the edible oils and fats and the like present in the oil-in-water type emulsified food are oxidized with time and the dissolved oxygen is consumed.

If the container-packed, oil-in-water type emulsified food product in accordance with the present invention is stored continuously in a dark place at a temperature of 20° C. after manufacturing, then the dissolved oxygen practically cannot be detected after about 3 months. However, slight oxidation caused by consumption of the dissolved oxygen does not degrade the taste of the container-packed, oil-in-water emulsified food product in accordance with the present invention.

BEST MODE FOR CARRYING OUT THE INVENTION

The present invention will be described in detail hereinbelow.

In the present specification, "%" stands for "wt. %", unless stated otherwise.

In accordance with the present invention, the oil-in-water type emulsified food is an emulsion obtained by emulsifying the water-phase starting materials and oil-phase starting materials so as to obtain an oil-in-water type emulsion. In order words, it is an emulsion in which oil droplets are dispersed in a water phase. Specific examples of such foods include mayonnaise, tartar sauce, and emulsified salad dressings. The preferred content ratio of water-phase starting materials and oil-phase starting materials is 90 to 10% of the latter per 10 to 90% of the former, but usually it is 80 to 30% of the latter per 20 to 70% of the former.

The oil-in-water type emulsified food in accordance with the present invention comprises edible oils and fats, vinegar, and egg yolk. No limitation is placed on the edible oils and fats and any oils and fats that can be generally used as starting materials for oil-in-water type emulsified foods can be employed. Specific examples include vegetable oils such as rapeseed oil, corn oil, cotton seed oil, safflower oil, olive oil, benibana (in Japanese) oil, soybean oil, rice oil, and palm oil, animal oils such as fish oil, oils and fats that are obtained by chemical treatment or fermentation such as MCT (medium-chain fatty acid triglycerides) and diglycerides.

Any vinegar that can be generally used as a starting material for oil-in-water type emulsified foods can be employed without limitation as the aforementioned vinegar. For example, grain vinegar such as rice vinegar or fruit vinegar can be used.

Fresh egg yolk obtained by industrially separating and removing egg white from the entire egg liquid obtained by breaking the eggs, frozen egg yolk obtained by freezing the fresh egg yolk after optional addition of sugar or salt, dry egg yolk obtained by drying the fresh egg yolk, and processed egg yolk that was subjected to enzyme treatments or that was processed to remove cholesterol or sugars can be used as the aforementioned egg yolk. Furthermore, a variety of egg starting materials that are not by themselves an egg yolk but contain the egg yolk, such as the entire egg liquid or entire egg powder can be also used.

In accordance with the present invention, the containers with oxygen barrier property include not only glass jars or metal cans which are absolutely impermeable to oxygen, but also resin containers in which the average value of oxygen permeability (referred to hereinbelow as "average oxygen permeability") of the entire wall surface of the container under the conditions of a temperature of 30° C., and a relative humidity outside the container of 80% and a relative humidity inside the container of 100%, is 50 cc/$m^2$·day·atm or less. Thus, the quality of the container-packed, oil-in-water type emulsified food product in accordance with the present invention is hardly affected by a small amount of oxygen that can penetrate into the product by permeating through the container walls with an average oxygen permeability of 50 cc/$m^2$·day·atm or less.

In order to use the container-packed, oil-in-water emulsified food product in accordance with the present invention as a product suitable for long-term storage with an appreciation period of more than 3 months, it is preferred that a container with an average oxygen permeability of 30 cc/$m^2$·day·atm or less is used. In particular, resin containers with an average oxygen permeability of 20 cc/$m^2$·day·atm or less or glass jars or metal cans which are absolutely impermeable to oxygen are even more preferred.

Measurements of the average oxygen permeability are conducted by the following procedure comprising steps ① to ⑤.

① A small amount of pure water is poured into a container which is the object of measurement and the container is filled with nitrogen and sealed. At this time, the relative humidity inside the container becomes 100%.

② A small portion of gas is sampled with an injector from the container filled and sealed in step ① and oxygen concentration $C_0$ in the gas is measured with an oxygen concentration meter (for example, a device for measuring partial pressure of microquantities of oxygen RO-102-SP, manufactured by Iijima Electronics Corp.).

③ The container filled and sealed in step ① is placed in a vessel with constant temperature and humidity adjusted to 30° C. and 80% of relative humidity, respectively, and stored for 20 days. In this process, the vessel with constant temperature and humidity is filled with usual air at normal atmospheric pressure.

④ A small portion of gas is sampled with an injector from the container that was stored for 20 days as described in ③ and oxygen concentration $C_1$ in the gas is measured in the same manner as in step ②.

⑤ The average oxygen permeability Q (cc/$m^2$·day·atm) is calculated by the following formula from the measured value of the initial oxygen concentration $C_0$ (% $O_2$) obtained in step ②, oxygen concentration $C_1$ (% $O_2$) after storage that was obtained in step ④, volume V (cc) of the container, surface area A($m^2$) of the inner surface of the container, storage interval T (day) (20 days), and partial pressure P (0.209 atm) of oxygen under atmospheric pressure.

$$Q = \frac{(C_1 - C_0)/100 \times V}{A \times T \times P}$$

Examples of resin containers with an average oxygen permeability of 50 cc/$m^2$·day·atm or less include PET blow-molded containers, blow-molded containers comprising laminates of ethylene-vinyl alcohol resin and polyethylene or polypropylene and the like, bag-like containers (pouches) composed of sheets in which Nylon or thin aluminum film is laminated on polyethylene and the like, or bag-like containers composed of laminated sheets having a deposited layer of silica, aluminum oxide, and the like.

In accordance with the present invention, "% $O_2$" showing the dissolved oxygen concentration, with the partial pressure of oxygen in the substance as an indicator, is used as the unit showing the dissolved oxygen concentration in the oil-in-water type emulsified food. In the "% $O_2$" units, in a state in which oxygen has been dissolved to a saturation state in a liquid in an atmosphere with a pressure of 1 atm, notwithstanding kinds of liquids, the dissolved oxygen concentration is 20.9% $O_2$ which is the same as partial pressure of oxygen in atmosphere. For example, if saturated concentration of dissolved oxygen in pure water at 25° C. and edible oil at 40° C. in an atmosphere with a pressure of 1 atm is represented in weight percentage ratio, then the respective values will be about 8.1 ppm and about 37.9 ppm, but in the "% $O_2$" units, the result will be 20.9% $O_2$ for both the pure water and the edible oil.

In accordance with the present invention, the "% $O_2$" units were used because the representation with "% $O_2$" units is accurate and widely used for representing the dissolved oxygen concentration in oil-in-water type emulsified foods.

Thus, the dissolved oxygen concentration in liquids is generally measured with an oxygen concentration meter. The detection unit (sensor) of the oxygen concentration meter has a structure generating a measurement signal corresponding to a partial pressure of oxygen. Because this measurement signal and the dissolved oxygen concentration represented in "% $O_2$" units satisfy a linear relationship, the measurement results can be obtained directly in "% $O_2$" units. For this reason, if it is desired to represent the dissolved oxygen concentration in weight percentage fraction (ppm) units, then the data in "% $O_2$" units that were obtained from the results of measurements conducted with the oxygen concentration meter have to be recalculated in the weight percentage fraction (ppm) units by using a recalculation table corresponding to the individual sample liquids and measurement temperatures. However, because no well-known or widely used recalculation table exists for mixtures containing starting materials of a large number of types, such as oil-in-water type emulsified foods, accurate measurement results are difficult to represent in the weight percentage fraction units which require recalculation.

The following two methods will be described as methods for measuring the dissolved oxygen concentration of oil-in-water emulsified food products.

[Measurement Method 1]

Measurements of the dissolved oxygen concentration are conducted by the procedure comprising the following steps ① to ④ by employing a polarograph-type oxygen concentration meter (DOL-40, manufactured by To a DKK Corp.).

① A sample is prepared by using deoxidized water (dissolved oxygen concentration b) that was subjected to deoxygenation by a nitrogen replacement method (nitrogen bubbling method) comprising the steps of causing nitrogen to flow through the water and diluting the oil-in-water type emulsified food which is the object of measurement with the deoxidized water by a factor of three.

② A stirring rod is inserted in advance in a glass bottle (incubation bottle with a capacity of 100 mL) with an open upper end, and the bottle is filled to the opening with the sample of step ① and sealed with a lid equipped with a detection unit of an oxygen concentration meter, so that no head space remains inside the glass bottle.

③ The dissolved oxygen concentration a is measured, while rotating the stirring rod in the bottom portion inside the bottle and stirring the sample.

④ The values of dissolved oxygen concentration a of the sample and the dissolved oxygen concentration b of the deoxidized water are substituted in the following formula, and the dissolved oxygen concentration DO (% $O_2$) of the oil-in-water type emulsified food is calculated by the following formula.

$$DO=\{a-(2b/3)\}\times 3.$$

In the above-described measurement method, the oil-in-water type emulsified food was dissolved with deoxidized water by a factor of three for the following reason. Because the oil-in-water type emulsified food such as mayonnaise has a high viscosity, the detection unit of the oxygen concentration meter is difficult to operate accurately if the sample is used as is. Furthermore, the dilution factor in diluting with the deoxidized water is not limited to three and is preferably 2 to 5.

[Measurement Method 2]

Measurements of the dissolved oxygen concentration are conducted by the procedure comprising the following steps ① to ③ by employing a fluorescence-type oxygen concentration meter (OxySense 101, manufactured by OxySense Co. (USA)).

① A fluorescent dye film for oxygen detection (OxyDot: manufactured by OxySense Co. (USA), exclusive detection film for OxySense 101) is pasted with a special silicone adhesive to the inner wall surface of a transparent or semi-transparent container made from glass or a resin.

② The container with the fluorescent dye film for oxygen detection pasted thereon is filled with the sample, the head space is replaced with nitrogen, and the container is sealed.

③ The dissolved oxygen concentration in the sample is measured by illuminating the fluorescent dye film for oxygen detection located inside the container with light from the outside of the container through the container wall and detecting the fluorescence emitted from the film with the sensor located outside of the container through the container wall.

With the measurement method 2, the dissolved oxygen concentration can be measured in a simple manner in a state in which the container is filled with the oil-in-water type emulsified food.

The measurement method 1 and measurement method 2 yield close measurement results.

The container-packed, oil-in-water type emulsified food product in accordance with the present invention comprises The oil-in-water type emulsified food comprising edible oils and fats, vinegar and egg yolk, and the food is packed and sealed in a container with an oxygen barrier property has a dissolved oxygen concentration of 0.8 to 8.1% $O_2$ immediately after manufacturing. Therefore, the product has balanced flavor. Moreover, excessive oxidation of the oil-in-water type emulsified food during storage is prevented. Therefore, good taste can be maintained over a long period.

The dissolved oxygen concentration was set as 0.8 to 8.1% $O_2$ because if it is less than 0.8% $O_2$, a strong pungent irritating smell of vinegar can be noted and the balance of flavors of the edible oils and fats, vinegar, and egg yolk is degraded. Therefore, the flavor balance of the entire oil-in-water type emulsified food is lost. On the other hand, if the dissolved oxygen concentration exceeds 8.1% $O_2$, there is no significant difference between the taste immediately after manufacturing and that of the conventional oil-in-water type emulsified food that was not subjected to deoxygenation. However, after a long-term storage, the oxidation odor is generated by excessive oxidation of edible oils and fats and taste degradation caused by oxidative decomposition and the like of various spices and seasonings can be observed.

It is not exactly clear why reducing the dissolved oxygen concentration of the oil-in-water type emulsified food to less than 0.8% $O_2$ results in a strong pungent and irritating odor of vinegar and lost flavor balance, but it can be supposed that this is because if the dissolved oxygen concentration is too low, the molecules of acetic acid present in the vinegar of the starting material are not uniformly dispersed in the oil-in-water type emulsified food and a large number of them gather together and form an aggregate.

Thus, it is well known that the pungent irritating odor of greater strength is produced if the acetic acid molecules form associations, without mixing with water molecules in the vinegar, but it can be supposed that oxygen molecules enhance the formation of clusters of acetic acid molecules and water molecules, thereby preventing the formation of associations of acetic acid molecules. Therefore, in accordance with the present invention, the pungent irritating odor inherent to vinegar apparently can be effectively suppressed by leaving oxygen at 0.8% $O_2$ or more in the oil-in-water type emulsified food.

Furthermore, in the container-packed, oil-in-water type emulsified food product in accordance with the present invention, storing in a dark place at a temperature of 20° C. for 10 days after manufacturing generally decreases the dissolved oxygen concentration to 0.5 to 6.2% $O_2$, but maintaining such storage conditions makes it possible to obtain a flavor with good balance over a long period of 3 months or more.

A method for manufacturing the container-packed, oil-in-water type emulsified food product in accordance with the present invention will be described below.

The method for manufacturing the container-packed, oil-in-water type emulsified food product in accordance with the present invention is not different from the methods for the manufacture of typical oil-in-water type emulsified foods, except that deoxygenation treatment is conducted in the manufacturing process, and manufacturing can be conducted by mixing water-phase starting materials composed of vinegar, egg yolk, pure water and various condiments and like, adding an oil-phase starting material thereto, stirring, and emulsifying.

No limitation is placed on the method for the aforementioned deoxygenation treatment, provided that the quantity of dissolved oxygen in the product can be reduced and the concentration of dissolved oxygen can be adjusted to 0.8 to 8.1% $O_2$, any known deoxygenation treatments can be utilized. Examples of methods that can be appropriately used include a bubbling method in which an inactive gas such as nitrogen or argon is blown into starting material in tanks for storing the edible oils and fats, vinegar, egg yolk, or pure water and the like, or in pipelines, a bubbling method in which an inert gas is similarly blown into an oil-in-water type emulsified food prior to sealing the container, a vacuum deoxygenation method in which the dissolved oxygen is removed by reducing pressure when the starting materials are mixed with a mixer, and a method using an enzyme that was disclosed in the aforementioned Kohyo (Japanese translation of a PCT application) Publication No. H11-504963.

Further, among the inactive gases, nitrogen is especially preferred because it is abundant in the air and comparatively inexpensive and because it produced no adverse effect on flavor and quality of the oil-in-water type emulsified food.

Furthermore, it is desired that a closed production line be used so that the oxygen present in the air is not admixed to the oil-in-water type emulsified food during manufacture.

Various starting materials can be used according to the type of the food which is manufactured, in addition to the aforementioned vinegar, egg yolk, and edible oils and fats and the like, as starting materials for the oil-in-water type emulsified food in accordance with the present invention. In case of mayonnaise or salad dressing, examples of such additional starting materials include seasonings such as table salt and sugar, juices such as citrus juices, acidulants such as citric acid, tartaric acid, and lactic acid, condiments such as sodium glutamate, spices such as mustard powder, oil mustard, and pepper. In case of tartar sauce those additional components may be finely cut pickles, onions, and the like. Furthermore, in case of food product of a low-calorie type which have a reduced amount of edible oils, egg white, soybean protein, starch, dextrin, cellulose, thickening polysaccharides and the like may be added.

When the oil-in-water type emulsified food with the dissolved oxygen concentration reduced to 0.8 to 8.1% $O_2$ that was obtained by the above-described manufacturing method is sealed in a container with oxygen barrier property, the operations have to be so conducted that substantially no air containing oxygen remains inside the container. Thus, bag-type containers are so filled that no head space remains. In molded containers in which head space remains in the opening of the container, the air present in the head space is preferably replaced with an inactive gas.

With the method for manufacturing an container-packed, oil-in-water type emulsified food product in accordance with the present invention, it is possible to manufacture the container-packed, oil-in-water type emulsified food product comprising the oil-in-water type emulsified food, which has excellent taste and quality, this food comprising edible oils and fats, vinegar, and egg yolk, and having the dissolved oxygen concentration of 0.8 to 8.1% $O_2$ immediately after manufacturing and, for example, the dissolved oxygen concentration of 0.5 to 6.2% $O_2$ after storing in a dark place at a temperature of 20° C. for 10 days after manufacturing.

EXAMPLES

Working Example 1

Bottled Emulsified Salad Dressing Product

A bottled emulsified salad dressing product with a reduced dissolved oxygen concentration was manufactured in the following manner by using the starting material composition shown in Table 1 below.

First, deoxygenation treatment of vegetable oil and pure water representing the starting materials was conducted by a nitrogen bubbling method and the dissolved oxygen concentration of both the vegetable oil and the pure water was reduced to about 2.0% $O_2$. Then the pure water subjected to deoxygenation treatment and other aqueous starting materials and ingredients were introduced in a sealed mixer (manufactured by Tokushu Kika Kogyo K. K., trade name TK Agihomomixer) and sealed therein, followed by degassing, reducing the pressure inside the mixer to 20 kPa, and stirring. After stirring for about 2 min, the vegetable oil subjected to deoxygenation treatment was poured in by small portions, while maintaining the state with a reduced pressure of 20 kPa, under stirring for about 8 min. As a result, the water-phase starting materials and vegetable oil were emulsified and a salad dressing was obtained. Then nitrogen was introduced into the mixer, and after the normal pressure was restored, hot water was passed through the external jacket of the mixer and thermal sterilization was conducted for about 30 min till the temperature rose to 65° C., while stirring the salad dressing inside the mixer. Small glass bottles were then rapidly filled each with 200 mL of the salad dressing from the mixer, this operation being so conducted as to minimize the penetration of air into the salad dressing, and after the head space in the bottles was replaced with nitrogen, they were sealed with polyethylene lids. The head space in this case was about 7 mL.

TABLE 1

| Starting material composition of emulsified salad dressing | Content ratio (%) |
|---|---|
| Oil-phase starting materials | |
| Vegetable oil | 38.0 |
| Water-phase starting materials | |
| Pure water | 28.0 |
| Vinegar (acidity 4.5%) | 6.0 |
| Sugar | 5.0 |
| Ketchup | 4.4 |
| Table salt | 1.6 |
| Fresh egg yolk | 1.2 |
| Lemon juice | 1.0 |
| Sodium glutamate | 0.4 |
| Worcester sauce | 0.3 |
| Mustard powder | 0.1 |
| Ingredients | |
| Pickles (small pieces) | 14.0 |
| Total | 100.0 |

The dissolved oxygen concentration immediately after the manufacture of the obtained bottled emulsified salad dressing product was measured by the above-described measurement method 1. The result was 3.2% $O_2$. When tasted, the salad dressing demonstrated excellent flavor balance with mellow full body taste, without the pungent irritating odor of vinegar.

Further, the dissolved oxygen concentration was also measured after storing the obtained bottled emulsified salad dressing product in a dark place at a temperature of 20° C. for 10 days after manufacturing. The dissolved oxygen concentration was 2.9% $O_2$. Tasting showed that the salad dressing had excellent flavor balance similar to that immediately after manufacturing.

Furthermore, the dissolved oxygen concentration was also measured after storing the obtained bottled emulsified salad dressing in a dark place at a temperature of 20° C. for 3 months after manufacturing. The dissolved oxygen concentration decreased to 0.1% $O_2$, but tasting showed that the salad dressing had excellent flavor balance similar to that immediately after manufacturing and after storing for 10 days, without the oxidation odor caused by oxidation of vegetable oil.

Working Example 2

Bottled Mayonnaise Product

A bottled mayonnaise product with a reduced dissolved oxygen concentration was manufactured in the following manner by using the starting material composition shown in Table 2 below.

First, deoxygenation treatment of vegetable oil and pure water representing the starting materials was conducted by a nitrogen bubbling method and the dissolved oxygen concentration in both the vegetable oil and the pure water was reduced to about 2.0% $O_2$. Then the pure water subjected to deoxygenation treatment and other aqueous starting materials and ingredients were introduced in a sealed mixer (manufactured by Tokushu Kika Kogyo K. K., trade name TK Agihomomixer) and sealed therein, followed by degassing, reducing the pressure inside the mixer to 20 kPa, and stirring. After stirring for about 2 min, the vegetable oil subjected to deoxygenation treatment was poured in by small portions, while maintaining the state with a reduced pressure of 20 kPa, under stirring for about 8 min. As a result, the water-phase starting materials and vegetable oil were emulsified and a mayonnaise was obtained. Then nitrogen was introduced into the mixer, and the normal pressure was restored. Glass jars were then filled each with 300 g of the mayonnaise from the mixer, this operation being conducted so as to minimize the penetration of air into the mayonnaise, and after the head space in the jars was replaced with nitrogen, they were sealed with metal lids. The head space in this case was about 25 mL.

TABLE 2

| Starting material composition of mayonnaise | Content ratio (%) |
|---|---|
| Oil-phase starting materials | |
| Vegetable oil | 72.5 |
| Water-phase starting materials | |
| Vinegar (acidity 4.5%) | 10.0 |
| Fresh egg yolk | 7.2 |
| Pure water | 4.0 |
| Fresh egg-white | 4.0 |
| Table salt | 1.7 |
| Sodium glutamate | 0.4 |
| Mustard powder | 0.2 |
| Total | 100.0 |

The dissolved oxygen concentration immediately after the manufacture of the obtained bottled mayonnaise product was measured by the above-described measurement method 1. The result was 3.6% $O_2$. When tasted, the mayonnaise demonstrated excellent flavor balance with mellow full body taste, without the pungent irritating odor of vinegar.

Further, the dissolved oxygen concentration was also measured after storing the obtained bottled mayonnaise in a dark place at a temperature of 20° C. for 10 days after manufacturing. The dissolved oxygen concentration was 3.0% $O_2$. Tasting showed that the mayonnaise had excellent flavor balance similar to that immediately after manufacturing.

Furthermore, the dissolved oxygen concentration was also measured after storing the obtained bottled mayonnaise in a dark place at a temperature of 20° C. for 3 months after manufacturing. The dissolved oxygen concentration decreased to 0.5% $O_2$, but tasting showed that the mayonnaise had excellent flavor balance similar to that immediately after manufacturing and after storing for 10 days, without the oxidation odor caused by oxidation of vegetable oil.

Working Example 3

Resin Bottle Container-Packed Mayonnaise Product

Resin bottle containers were filled each with 500 g of the mayonnaise manufactured by using the same composition and same process as in Working Example 2, the filling being conducted so as to minimize the penetration air, and after the head space in the containers was replaced with nitrogen, a laminated resin film having an aluminum layer was fused to the opening to seal the container. The headspace in this case was about 22 mL.

The containers had a bottle-like shape with a height of 20 cm and an open upper end and were manufactured by a blow molding method by laminating 5 layers of polyethylene and ethylene-vinyl alcohol copolymer resin. The average oxygen permeability was 30 cc/m$^2$·day·atm.

Further, prior to filling with the mayonnaise, fluorescent dye films for oxygen detection (OxyDot: manufactured by OxySense Co. (USA), exclusive detection film for OxySense 101) were pasted with a special silicone adhesive in three places (one place on the inner wall surface in a position about 5 cm below the upper end of the container and two places on the inner wall surface in a position about 14 cm below the upper end of the container), so that the dissolved oxygen concentration of mayonnaise could be measured with the aforementioned measurement method 2.

In order to determine the dissolved oxygen concentration immediately after the manufacture of the resin bottle container-packed mayonnaise product that was thus obtained, fluorescence of the oxygen detection fluorescent dye films located in three places was measured with the abovementioned measurement method 2 and the data obtained were averaged. The result was 5.3% $O_2$.

When tasted, the mayonnaise demonstrated excellent flavor balance with mellow full body taste, without the pungent irritating odor of vinegar.

Further, the dissolved oxygen concentration was also measured after storing the obtained bottled mayonnaise in a dark place at a temperature of 20° C. for 10 days after manufacturing. The dissolved oxygen concentration was 3.9% $O_2$. Tasting showed that the mayonnaise had excellent flavor balance similar to that immediately after manufacturing.

Furthermore, the dissolved oxygen concentration was also measured after storing the obtained bottled mayonnaise in a dark place at a temperature of about 20° C. for 3 months after manufacturing. The dissolved oxygen concentration decreased to 0.6% $O_2$, but tasting showed that the mayonnaise had excellent flavor balance similar to that immediately after manufacturing and after storing for 10 days, without oxidation odor caused by oxidation of vegetable oil.

Test Example 1

The effect produced by changes in the dissolved oxygen concentration in the container-packed, oil-in-water type emulsified food products on the taste of the oil-in-water type emulsified food was tested in the following manner.

The bottled emulsified salad dressing product obtained in Working Example 1 was considered as sample c. Further, samples a, b, d, e of the bottled emulsified salad dressing product of four types were manufactured by the manufacturing process described in Working Example 1, except that the dissolved oxygen concentration (DO) immediately after the bottled emulsified salad dressing has been manufactured was changed successively, as shown in Table 3. The dissolved oxygen concentration in the bottled emulsified salad dressing product was changed by appropriately adjusting the nitrogen bubbling time in the pure water and vegetable oil as starting materials and by appropriately changing the inner pressure in the mixer during stirring and emulsification of the starting materials.

Measurements of the dissolved oxygen concentration in each sample by the aforementioned measurement method 1 and evaluation of taste were carried out three times, immediately after the samples have been manufactured, after storing the samples in a dark place for 10 days at a temperature of 20° C. after manufacturing, and after storing the samples in a dark place for 3 months at a temperature of 20° C. after manufacturing.

The test results are shown in Table 3.

TABLE 3

| | | Sample | | | | |
|---|---|---|---|---|---|---|
| | | a | b | c | d | e |
| DO immediately after manufacturing (% $O_2$) | | 0.4 | 0.8 | 3.2 | 8.1 | 8.8 |
| Taste evaluation | Balance | Poor C | Good A | Good A | Good A | Good A |
| | Oxidation taste | No A | No A | No A | No A | No A |
| DO after 10 days (% $O_2$) | | 0.2 | 0.5 | 2.9 | 6.2 | 6.6 |
| Taste evaluation | Balance | Poor C | Good A | Good A | Good A | Good A |
| | Oxidation taste | No A | No A | No A | No A | No A |
| DO after 3 months (% $O_2$) | | 0.0 | 0.1 | 0.1 | 0.2 | 0.4 |
| Taste evaluation | Balance | Fair B | Good A | Good A | Good A | Fair B |
| | Oxidation taste | No A | No A | No A | No A | Yes C |

Table 3 shows that samples b, c, d with a dissolved oxygen concentration of 0.8 to 8.1% $O_2$ immediately after manufacturing or a dissolved oxygen concentration of 0.5 to 6.2% $O_2$ after storing in a dark place for 10 days at a temperature of 20° C. after manufacturing had excellent quality with good flavor balance immediately after manufacturing and no oxidation odor even after storing from 3 months.

Test Example 2

The bottled emulsified mayonnaise product obtained in Working Example 3 was considered as sample C. Further, samples A, B, D, E of the bottled emulsified mayonnaise product of four types were manufactured by the manufacturing process described in Working Example 3, except that the dissolved oxygen concentration (DO) immediately after the bottled emulsified mayonnaise product has been manufactured was changed successively, as shown in Table 4. The dissolved oxygen concentration in the bottled emulsified mayonnaise product was changed by appropriately adjusting the nitrogen bubbling time in the pure water and vegetable oil as starting materials and by appropriately changing the inner pressure in the mixer during stirring and emulsification of the starting materials.

Measurements of the dissolved oxygen concentration in each sample by the aforementioned measurement method 2 and evaluation of taste were carried out three times, immediately after the samples have been manufactured, after storing the samples in a dark place for 10 days at a temperature of 20° C. after manufacturing, and after storing the samples in a dark place for 3 months at a temperature of 20° C. after manufacturing.

The test results are shown in Table 4.

TABLE 4

| | | Sample | | | | |
|---|---|---|---|---|---|---|
| | | A | B | C | D | E |
| DO immediately after manufacturing (% $O_2$) | | 0.5 | 1.08 | 5.3 | 7.1 | 9.6 |
| Taste evaluation | Balance | Poor C | Good A | Good A | Good A | Good A |
| | Oxidation taste | No A | No A | No A | No A | No A |
| DO after 10 days (% $O_2$) | | 0.2 | 0.6 | 3.9 | 5.7 | 8.5 |
| Taste evaluation | Balance | Poor C | Good A | Good A | Good A | Good A |
| | Oxidation taste | No A | No A | No A | No A | No A |

TABLE 4-continued

| | | Sample | | | | |
|---|---|---|---|---|---|---|
| | | A | B | C | D | E |
| DO after 3 months (% O$_2$) | | 0.2 | 0.4 | 0.6 | 0.6 | 1.0 |
| Taste evaluation | Balance | Good A | Good A | Good A | Good A | Fair B |
| | Oxidation taste | No A | No A | No A | No A | Yes C |

Table 4 shows that samples B, C, and D with a dissolved oxygen concentration of 1.0 to 7.1% O$_2$ immediately after manufacturing or a dissolved oxygen concentration of 0.6 to 5.7% O$_2$ after storing in a dark place for 10 days at a temperature of 20° C. after manufacturing had excellent quality with good flavor balance immediately after manufacturing and no oxidation odor even after storing from 3 months.

INDUSTRIAL APPLICABILITY

The container-packed, oil-in-water type emulsified food product in accordance with the present invention or the container-packed, oil-in-water type emulsified food product which is obtained by the manufacturing method in accordance with the present invention comprises the oil-in-water type emulsified food comprising edible oils and fats, vinegar, and egg yolk, and being packed and sealed in a container with oxygen barrier property, and having a dissolved oxygen concentration immediately after manufacturing adjusted to 0.8 to 8.1% O$_2$. For example, in such a product, the dissolved oxygen concentration after storing in a dark place for 10 days at a temperature of 20° C. after manufacturing becomes 0.5 to 6.2% O$_2$. This container-packed, oil-in-water type emulsified food product demonstrates excellent flavor with good balance and has mellow full body taste, without the pungent irritating odor of vinegar. Furthermore, because the container-packed, oil-in-water type emulsified food product is not excessively oxidized during storage, it can preserve good taste for a long time.

The invention claimed is:

1. A container-packed, oil-in-water emulsified food product, comprising an oil-in-water emulsified food comprising edible oil and fat, vinegar, and egg yolk, wherein:
    an oil-phase starting material is 30 to 80 wt % of the food;
    the edible oil and fat are deoxygenated;
    the food is packed and sealed in a container having an average oxygen permeability of 50 cc/m$^2$.day.atm or less; and
    the food has a dissolved oxygen concentration of 0.8 to 8.1% O$_2$ immediately after manufacturing.

2. The container-packed, oil-in-water emulsified food product according to claim 1, wherein the dissolved oxygen concentration immediately after manufacturing is 1.0 to 7.1% O$_2$ as a value obtained by measuring with a fluorescent oxygen meter.

3. The container-packed, oil-in-water emulsified food product according to claim 1, wherein the dissolved oxygen concentration after storing in a dark place at a temperature of 20° C. for 10 days after manufacturing is 0.5 to 6.2% O$_2$.

4. The container-packed, oil-in-water emulsified food product according to claim 1, wherein the dissolved oxygen concentration after storing in a dark place at a temperature of 20° C. for 10 days after manufacturing is 0.6 to 5.7% O$_2$ as a value obtained by measuring with a fluorescent oxygen meter.

5. A method for manufacturing a container-packed, oil-in-water emulsified food product comprising an oil-in-water emulsified food comprising edible oil and fat, vinegar and egg yolk, the method comprising:
    adjusting a dissolved oxygen concentration in the oil-in-water emulsified food to 0.8 to 8.1% O$_2$ by a deoxygenation treatment of the oil-in-water emulsified food or starting materials therefor, at least the edible oil and fat being subjected to the deoxygenation treatment; and
    packing and sealing the food in a container having an average oxygen permeability of 50 cc/m$^2$.day.atm or less;
    wherein an oil-phase starting material is 30 to 80 wt % of the food.

6. The method according to claim 5, wherein the dissolved oxygen concentration in the oil-in-water emulsified food product is 1.0 to 7.1% O$_2$ as a value obtained by measuring with a fluorescent oxygen meter.

* * * * *